US012511086B2

(12) United States Patent
Saotome (10) Patent No.: US 12,511,086 B2
(45) Date of Patent: Dec. 30, 2025

(54) IMAGE PROCESSING APPARATUS, IMAGE FORMATION APPARATUS, IMAGE PROCESSING METHOD, AND STORAGE MEDIUM

(71) Applicant: CANON KABUSHIKI KAISHA, Tokyo (JP)

(72) Inventor: Yutaka Saotome, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/415,442

(22) Filed: Jan. 17, 2024

(65) Prior Publication Data

US 2024/0248662 A1    Jul. 25, 2024

(30) Foreign Application Priority Data

Jan. 19, 2023   (JP) ................. 2023-006376

(51) Int. Cl.
*G06F 3/12* (2006.01)
(52) U.S. Cl.
CPC .......... *G06F 3/1267* (2013.01); *G06F 3/1203* (2013.01)
(58) Field of Classification Search
None
See application file for complete search history.

(56) References Cited

U.S. PATENT DOCUMENTS

| 2004/0207860 | A1* | 10/2004 | Kurihara | H04N 1/00933 358/1.9 |
| 2005/0152002 | A1* | 7/2005 | Shirakawa | H04N 5/272 358/1.18 |
| 2011/0199418 | A1* | 8/2011 | Kaiho | B41J 2/2114 347/17 |
| 2011/0199425 | A1* | 8/2011 | Kaiho | B41J 2/16585 347/30 |
| 2014/0319763 | A1* | 10/2014 | Maruta | B65H 5/062 271/228 |

FOREIGN PATENT DOCUMENTS

JP   2010284821 A   12/2010

\* cited by examiner

*Primary Examiner* — Darryl V Dottin
(74) *Attorney, Agent, or Firm* — Canon U.S.A., Inc. IP Division (57) ABSTRACT

An image processing apparatus including a reception unit that receives a printing job, a generation unit that generates printing image data that a plurality of pieces of image data corresponding to a plurality of printing jobs received in a predetermined wait time by the reception unit are allocated in a direction orthogonal to a sheet conveyance direction, and a control unit that controls a printing apparatus to execute printing processing based on the printing image data. In a case where the printing apparatus is in a predetermined state in which it cannot perform printing, the control unit extends the predetermined wait time.

11 Claims, 7 Drawing Sheets

| JOB NUMBER | MAIN SCANNING SIZE | ARRANGEMENT FLAG | RECEPTION TIME POINT |
|---|---|---|---|
| 001 | 300 | 1 | 13:11:02 |
| 002 | 400 | 1 | 13:11:45 |
| 003 | 500 | 1 | 13:13:15 |
| 004 | 600 | 0 | 13:13:30 |

FIG.6A

| ARRANGEMENT | ARRANGEMENT FLAG |
|---|---|
| YES | 1 |
| NO | 0 |

| ATTRIBUTE ID | ATTRIBUTE VALUE | ~700 |
|---|---|---|
| ... | ... | |
| 11 | 00:02:00 | |
| 13 | 00:00:30 | |
| 14 | 00:05:00 | |
| 15 | 00:00:00 | |
| 16 | 0 | |
| 17 | 0 | |
| 31 | 1500 | |
| 32 | 100 | |
| 41 | 0 | |
| ... | ... | |

FIG.7B

| ATTRIBUTE | ATTRIBUTE ID |
|---|---|
| ... | ... |
| RECEPTION WAIT TIME | 11 |
| EXTENDED TIME | 13 |
| UPPER LIMIT TIME | 14 |
| RECEPTION WAIT ELAPSED TIME | 15 |
| RECEPTION WAIT EXTENSION FLAG | 16 |
| RECEPTION WAIT COMPLETION FLAG | 17 |
| CONFIGURABLE WIDTH | 31 |
| EXECUTION MARGIN WIDTH | 32 |
| SHEET EXISTENCE FLAG | 41 |
| ... | ... |

FIG.7C

| RECEPTION WAIT EXTENSION | RECEPTION WAIT EXTENSION FLAG |
|---|---|
| YES | 1 |
| NO | 0 |

FIG.7D

| RECEPTION WAIT | RECEPTION WAIT EXTENSION FLAG |
|---|---|
| COMPLETED | 1 |
| NOT COMPLETED | 0 |

FIG.7E

| SHEET | SHEET EXISTENCE FLAG |
|---|---|
| AVAILABLE | 1 |
| NOT AVAILABLE | 0 |

IMAGE PROCESSING APPARATUS, IMAGE FORMATION APPARATUS, IMAGE PROCESSING METHOD, AND STORAGE MEDIUM

BACKGROUND

Field

The present disclosure relates to an image processing technology for arranging and printing a plurality of images on a sheet.

Description of the Related Art

Conventionally, an image formation apparatus such as a wide-format printer configured to print images by using a large sheet for printing posters and the like has been known. Such a sheet used for printing by a wide-format printer has a large width, and thus large margins remain and sheet waste often occurs in a case where images are arranged and printed one by one in a sheet conveyance direction (sheet longitudinal direction). Thus, a function called nesting printing has been conventionally available that reduces sheet margins, which are otherwise wasted, by allocating and printing a plurality of images corresponding to a plurality of printing jobs in a main scanning direction (sheet lateral direction) of an image formation apparatus.

In nesting printing, a plurality of printing jobs received from a host apparatus are stored in a storage apparatus, and a plurality of images corresponding to the plurality of printing jobs are arranged in the sheet lateral direction. In this case, a predetermined printing job reception wait time is provided to reduce margins by arranging as many images as possible in the sheet lateral direction. The printing job reception wait time is desirably set to be as long as possible to reduce sheet waste by arranging a large number of images. In a case where the reception wait time is set to be long, the number of printing jobs that can be received increases and the number of images can be arranged in the sheet lateral direction increases, but printing start is adversely delayed.

According to a technology disclosed in Japanese Patent Laid-Open No. 2010-284821, in a case where nesting printing is performed, the reception wait time is extended in accordance with a margin width in the sheet lateral direction after the elapse of a predetermined time since reception of the first printing job. The reception wait time is extended as large margins are more likely to remain so that margins are reduced while delay of printing start is reduced.

However, according to Japanese Patent Laid-Open No. 2010-284821, the printing job reception wait time is determined irrespective of whether printing can be started, and accordingly, the printing job reception wait time is not extended even when an image formation apparatus cannot start printing due to shortage of sheets, toner, or ink. Thus, in a case where printing cannot be started and a wait time occurs for a reason other than wait for reception of printing jobs, the wait time cannot be utilized to reduce any unnecessary margin on a sheet.

SUMMARY

Thus, the present disclosure is intended to reduce any unnecessary margin on a sheet in a case where a plurality of images are arranged and printed on the sheet.

The present disclosure is an image processing apparatus including: a reception unit configured to receive a printing job; a generation unit configured to generate printing image data that a plurality of pieces of image data corresponding to a plurality of printing jobs received in a predetermined wait time by the reception unit are allocated in a direction orthogonal to a sheet conveyance direction; and a control unit configured to control a printing apparatus to execute printing processing based on the printing image data, in which the control unit extends the predetermined wait time in a case where a printing apparatus configured to perform printing based on printing image data generated by the generation unit is in a predetermined state in which the printing apparatus cannot perform printing.

Further features of the present disclosure will become apparent from the following description of embodiments with reference to the attached drawings.

DESCRIPTION OF THE EMBODIMENTS

Embodiments will be described below in detail with reference to the accompanying drawings. The embodiments below do not limit the disclosure according to the claims. Although a plurality of features are described in the embodiments, not all the plurality of properties are essential for the disclosure and the plurality of properties may be optionally combined. Components identical or similar to each other in the accompanying drawings are denoted by the same reference number and duplicate description thereof is omitted.

(Apparatus Configuration)

Figure 1:
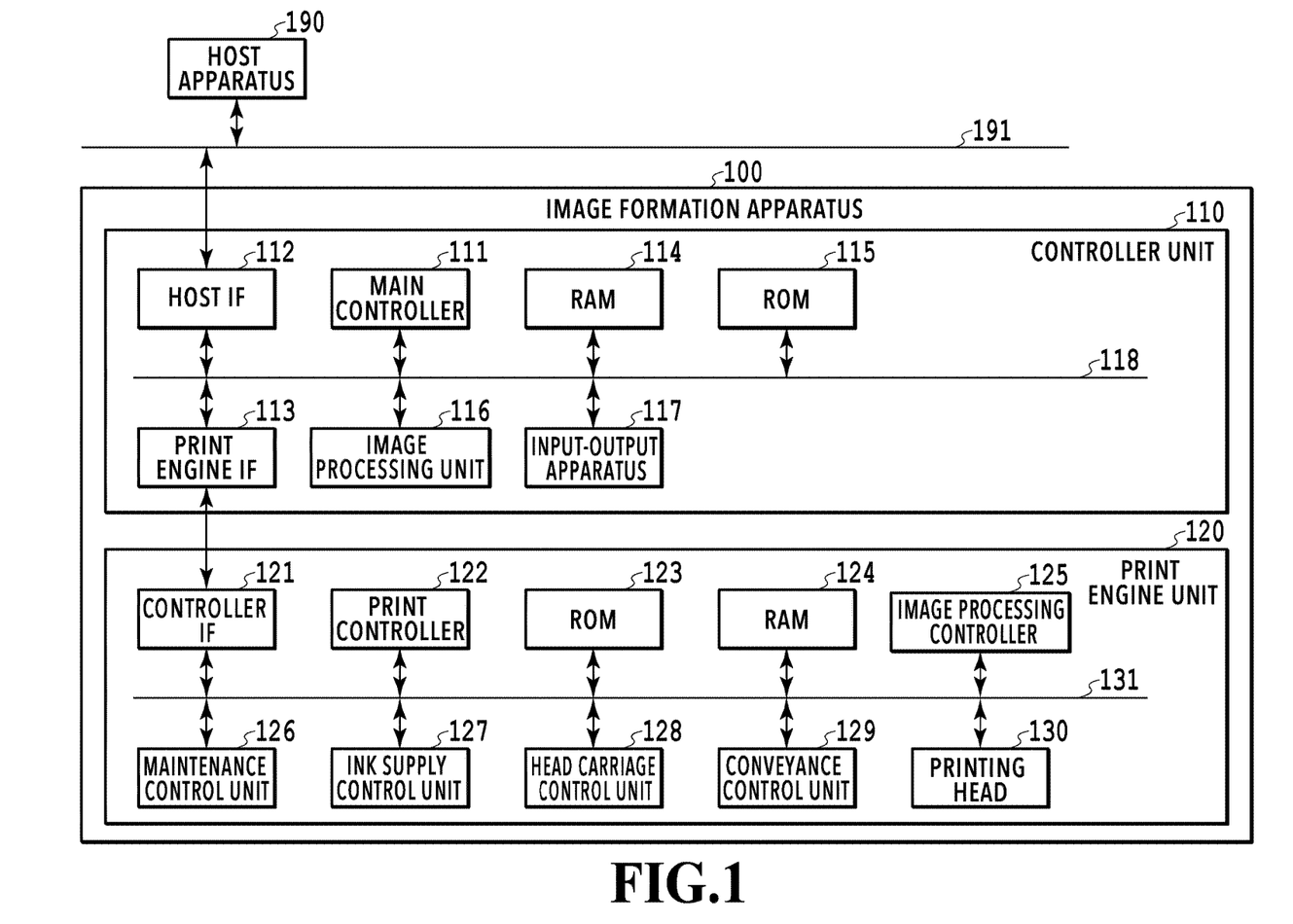
FIG. 1 is a diagram illustrating a hardware schematic configuration of an image formation apparatus according to an embodiment of the present disclosure.

FIG. 1 is a diagram illustrating a hardware schematic configuration of an image formation apparatus according to the present embodiment. The image formation apparatus described in the present embodiment has only a print function but the present disclosure is not limited thereto. For example, the image formation apparatus may be configured to function as a copier further including a reading apparatus configured to read an image on a document or may be a multi-function peripheral (MFP) additionally having any other function.

In FIG. 1, an image formation apparatus 100 includes a controller unit 110 and a print engine unit 120. The image formation apparatus 100 is connectable to a host apparatus 190 through a network 191. The controller unit 110 includes a main controller 111, a host IF 112, a print engine IF 113, a RAM 114, a ROM 115, an image processing unit 116, and an input-output apparatus 117. These components are connected to one another through a system bus 118.

The main controller 111 configured by a CPU controls operation of the entire image formation apparatus 100 to perform printing operation by using the RAM 114 as a work area in accordance with computer programs and various parameters stored in the ROM 115. For example, once image data is input from the host apparatus 190 through the host IF 112, the image data received by the image processing unit 116 is provided with predetermined image processing in accordance with an instruction from the main controller 111. Then, the main controller 111 transmits the image data provided with the image processing to the print engine unit 120 through the print engine IF 113. The RAM 114 is used as a work area of the main controller 111 and as a temporary storage region for various kinds of reception data and stores various setting data. The ROM 115 stores computer programs to be executed by the main controller 111 and various kinds of data necessary for various kinds of operation of the image formation apparatus 100.

The image processing unit 116 performs various kinds of image processing. For example, the image processing unit 116 performs processing through which image data expressed by a page description language is transformed (converted) into bit map image data. For example, the image processing unit 116 performs processing through which the color space (for example, YCbCr) of input image data converted into a typical RGB color space (for example, sRGB). For example, the image processing unit 116 performs various kinds of image processing such as resolution conversion into the number of pixels that is effective (can be subjected to printing processing by the image formation apparatus 100), image analysis, and image correction as necessary. For example, the image processing unit 116 generates one piece of image data by synthesizing a plurality of pieces of image data. Image data obtained through these kinds of image processing is stored in the RAM 114. The input-output apparatus 117 includes a hard key and a panel for a user to perform various kinds of operations, and a display unit for displaying (notifying) various kinds of information to the user. The input-output apparatus 117 may perform information display to the user by outputting sound (such as buzzer or voice) based on acoustic information from a voice generator.

The print engine unit 120 is a printing unit configured to perform image formation. The print engine unit 120 includes a controller IF 121, a print controller 122, a ROM 123, a RAM 124, and an image processing controller 125. The print engine unit 120 further includes a maintenance control unit 126, an ink supply control unit 127, a head carriage control unit 128, a conveyance control unit 129, and a printing head 130. These components are connected to one another through a system bus 131.

The print controller 122 configured by a CPU controls various mechanisms included in the print engine unit 120 by using the RAM 124 as a work area in accordance with computer programs and various and parameters stored in the ROM 123. Once various kinds of commands and image data are received through the controller IF 121, the print controller 122 temporarily stores the commands and image data in the RAM 124.

The print controller 122 controls the image processing controller 125 to convert stored image data into printing data that can be used by the printing head 130 for printing operation. Once the printing data is generated, the print controller 122 controls the printing head 130 to execute printing operation based on the printing data. In this case, the print controller 122 requests the conveyance control unit 129 to convey a sheet. In accordance with an instruction from the print controller 122, printing operation is executed by the printing head 130 in cooperation with conveyance operation of the sheet, and accordingly, printing processing is performed. The head carriage control unit 128 changes the direction and position of the printing head 130 in accordance with the operation state of the image formation apparatus 100 such as a maintenance state or a printing state. The ink supply control unit 127 controls the pressure of ink supplied to the printing head 130 to stay in an appropriate range. The maintenance control unit 126 controls cleaning of a conveyance roller, which is controlled by the conveyance control unit 129, and the printing head 130.

The printing head 130 is a printing unit configured to image printing and prints images on a sheet based on printing data. The printing head 130 holds, for example, a plurality of printing heads for a plurality of colors and forms images on a sheet by discharging ink in synchronization with conveyance of the sheet. The image formation apparatus according to the present embodiment is described as a printer of an ink jet scheme using ink as a printing material, for example, but is not limited thereto. The present disclosure is also applicable to printing apparatuses of various printing schemes, such as a thermal printer (for example, a sublimation type or a heat transfer type), a dot impact printer, an LED printer, and a laser printer of an electrophotographic scheme.

In the present embodiment, the input-output apparatus 117 exists inside the image formation apparatus 100, but is not limited to this configuration and, for example, may be connected as an external component through the network 191. The host apparatus 190 may serve as the input-output apparatus 117. The image formation apparatus 100 may be further connectable to another input-output apparatus through the network 191 or the like in addition to the input-output apparatus 117. In the present embodiment, image data is stored in the RAM 114 and the RAM 124 but may be stored in a non-transitory storage apparatus such as an HDD. The host apparatus 190 is, for example, an external apparatus as a supply source of image data and a printer driver is installed thereon. The image formation apparatus 100 may be provided with a data provision apparatus as a supply source of image data, such as a digital camera or a smartphone, in place of the host apparatus 190. The form of connection between each instrument and the image formation apparatus 100 is not limited to connection through the network 191 but may be, for example, direct connection through wireless communication.

A computer program for achieving functions of the present embodiment may be supplied to a system or an apparatus through networks or various storage media. A computer (such as a CPU or an MPU) of the system or apparatus may read the computer program and may execute the functions or cause various mechanisms to execute the functions. The computer program may be executed by one computer or in cooperation of a plurality of computers. Not all the above-described processing does not necessarily need to be implemented by software but part or all of the processing may be implemented by hardware such as an ASIC. The present disclosure is not limited to a configuration in which one CPU performs all the processing, but a plurality of CPUs may perform the processing in cooperation as appropriate, or any of the processing may be executed by one CPU and the other processing may be performed by a plurality of CPUs in cooperation.

(Embodiment 1)

In the present embodiment, the image formation apparatus 100 receives a first printing job having a size of "300" in a main scanning direction (direction orthogonal to a sheet conveyance direction) of the printing head 130 at "13:11:02" in a state in which no sheet is set. Subsequently, the image formation apparatus 100 receives a second printing job having a length of "400" in the main scanning direction at "13:11:45". Thereafter, the image formation apparatus 100 receives a third printing job having a length of "500" in the main scanning direction at "13:13:15". In addition, the image formation apparatus 100 receives a fourth printing job having a length of "600" in the main scanning direction at "13:13:30". Thereafter, the image formation apparatus 100 to which a sheet is set arranges, in the main scanning direction, a plurality of images represented by a plurality of pieces of image data corresponding to the first to third printing jobs received in the first, second, and third places and executes printing. Such a use case will be described below.

Figure 2:
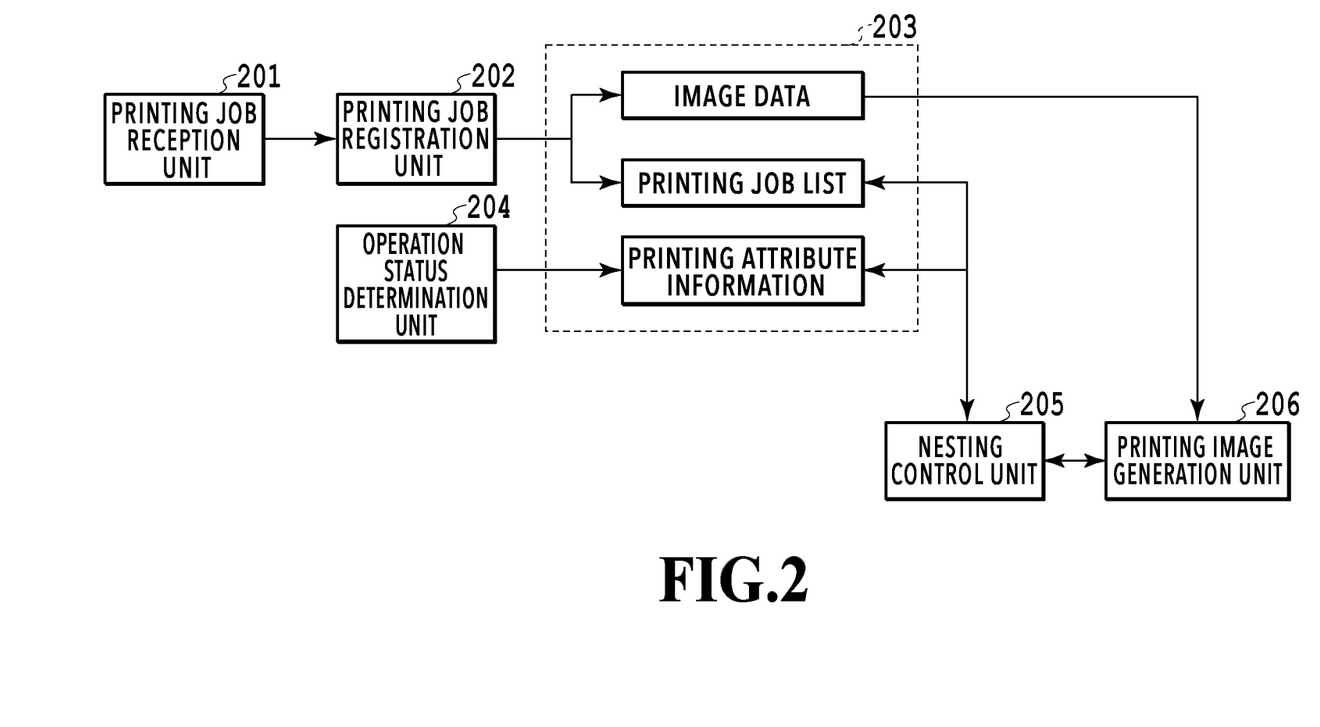
FIG. 2 is a diagram illustrating a software schematic configuration of the image formation apparatus according to the embodiment of the present disclosure.

FIG. 2 is a diagram illustrating a software schematic configuration of the image formation apparatus according to the present embodiment. The configuration is implemented as the main controller 111 loads program codes stored in the ROM 115 onto the RAM 114 and executes the program codes. A printing job reception unit 201 obtains printing jobs received from the host apparatus 190 and outputs the printing jobs to a printing job registration unit 202. The printing job registration unit 202 allocates a job number to each printing job obtained by the printing job reception unit 201 and stores, in a storage unit 203 in association with the job number, setting information and image data included in the printing job. The setting information is registered to a printing job list as described later. An operation status determination unit 204 determines whether the image formation apparatus 100 can start printing processing, and outputs a result of the determination to a nesting control unit 205. The nesting control unit 205 determines printing jobs as nesting printing targets based on the printing job list and printing attribute information stored in the storage unit 203 and outputs a result of the determination to a printing image generation unit 206. The printing image generation unit 206 generates printing image data that images corresponding to the printing jobs determined as nesting printing targets by the nesting control unit 205 are arranged in the main scanning direction.

Figure 3:
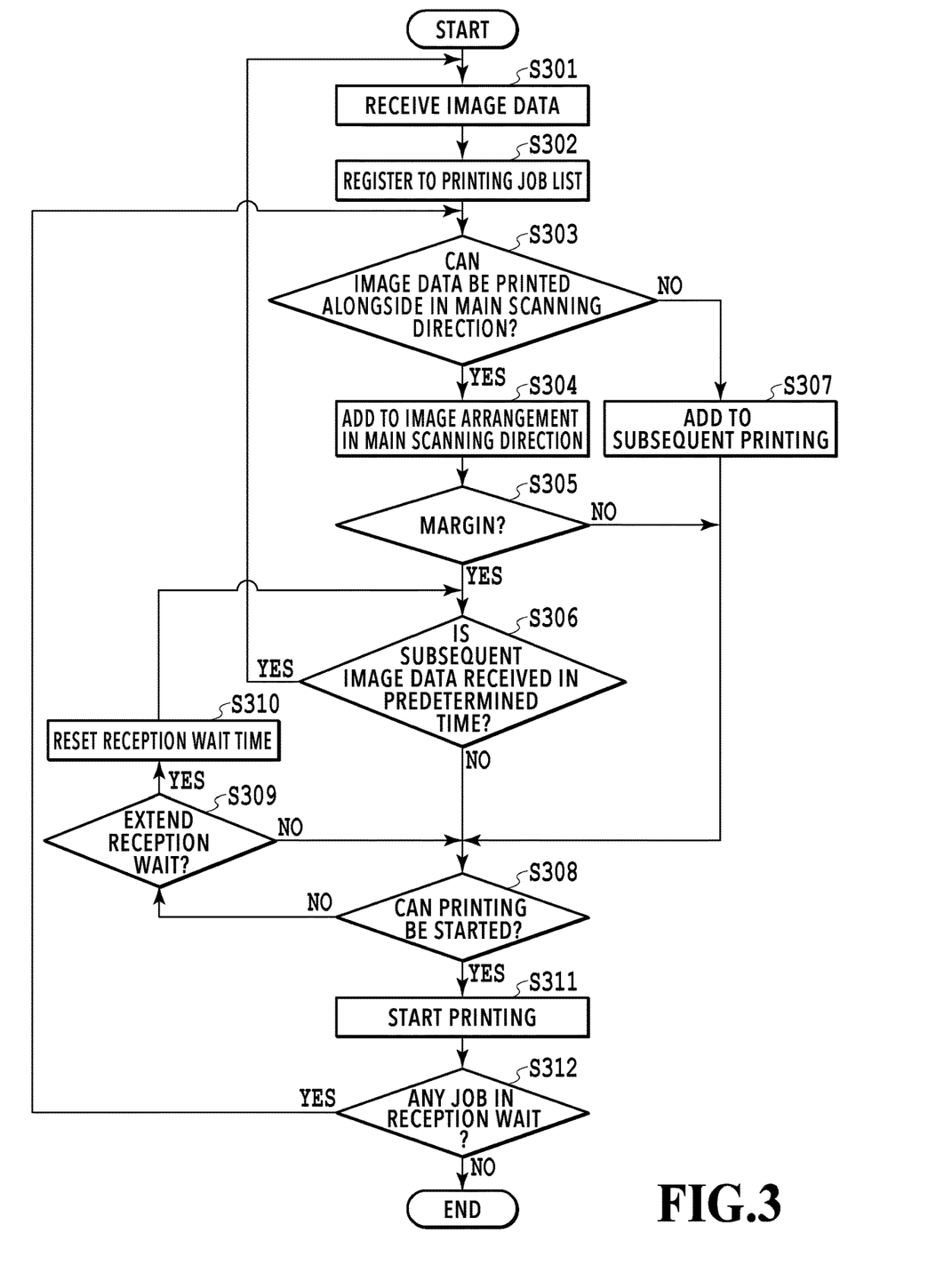
FIG. 3 is a flowchart illustrating an example of image data reception to printing completion by the image formation apparatus according to the embodiment of the present disclosure.

FIG. 3 is a flowchart illustrating a printing procedure in the present embodiment. Processing of the flowchart illustrated in FIG. 3 is executed as the main controller 111 loads program codes stored in the ROM 115 onto the RAM 114 and executes the program codes.

Figure 4:
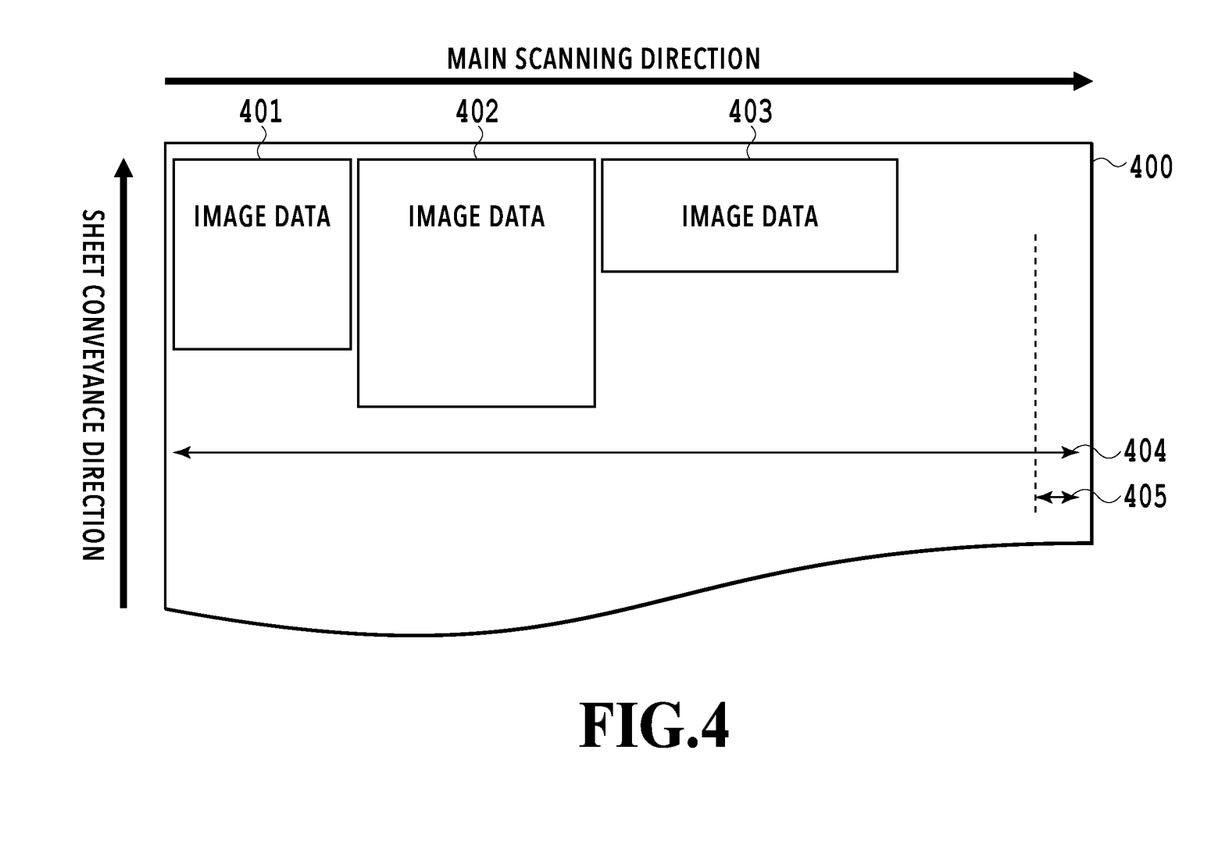
FIG. 4 is a schematic diagram illustrating an example of image data arranged on a sheet to be printed by the image formation apparatus according to the embodiment of the present disclosure.

FIG. 4 is a schematic diagram illustrating images arranged on a sheet in the image formation apparatus 100. In the present embodiment, the image formation apparatus 100 receives a printing job including image data of an image 401, a printing job including image data of an image 402, and a printing job including image data of an image 403 in the stated order. Then, as illustrated in FIG. 4, the image formation apparatus 100 arranges the plurality of images extracted from the plurality of received printing jobs in the main scanning direction from the left end of a printable region of a sheet 400 as the image 401, the image 402, and the image 403 in this order. A configurable width 404 illustrated in FIG. 4 is the width of a region in which images can be arranged on the sheet 400 in the main scanning direction. The image formation apparatus 100 executes printing processing in a case where a margin width from the right end of the printable region of the sheet 400 to the arranged images is smaller than a predetermined execution margin width 405.

The present embodiment will be described below with reference to FIGS. 1 to 4.

Since the loop of S301 to S306 is repeated a number of time equal to the number of received printing jobs, description of any duplicate part will be simplified or omitted.

Figure 5:
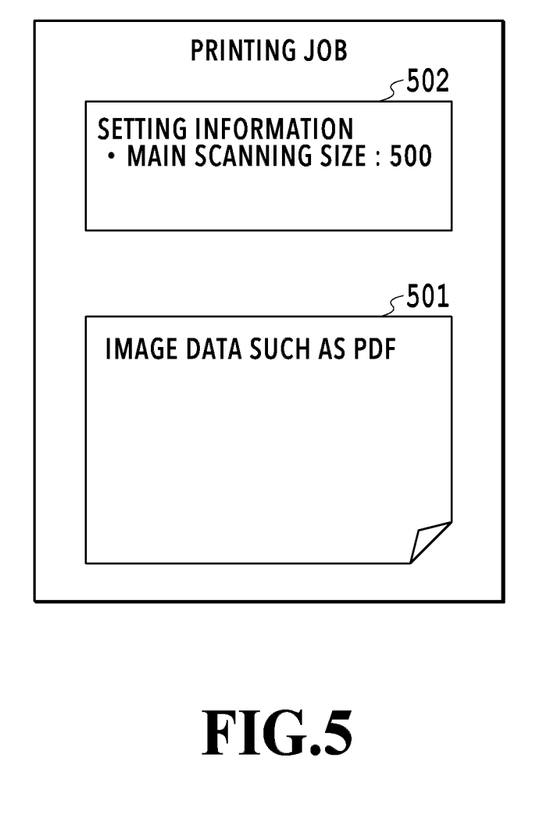
FIG. 5 is a schematic diagram illustrating a printing job according to the embodiment of the present disclosure.

At S301, the printing job reception unit 201 receives a printing job from the host apparatus 190 by using the host IF 112 and starts printing job reception wait. FIG. 5 is a diagram illustrating a specific example of the structure of data included in a printing job transmitted from the host apparatus 190. The printing job includes image data 501 and setting information 502 related to printing. The image data 501 is image data desired by the user to be printed and may be in an image format such as Portable Document Format (PDF) or Joint Photographic Experts Group (JPEG). The setting information 502 includes a group of setting values of the image formation apparatus 100, which are used to print the image data 501. As illustrated in FIG. 5, the setting information 502 in the present embodiment includes at least the length of an image represented by the image data 501 in the main scanning direction. In addition, the setting information 502 may include, for example, information of a reception wait time from start to completion of printing job reception wait or information of an execution margin width for determining whether to complete printing job reception wait and execute printing. The reception wait time may be set in a storage apparatus of the image formation apparatus 100 in place of the setting information of the printing job. The image formation apparatus 100 executes printing processing based on the setting information 502 included in the printing job.

At S302, the printing job registration unit 202 extracts the image data 501 and the setting information 502 from the printing job received at the latest S301, stores the image data 501 in the RAM 114, and registers the setting information 502 to a printing job list.

Figure 6A:
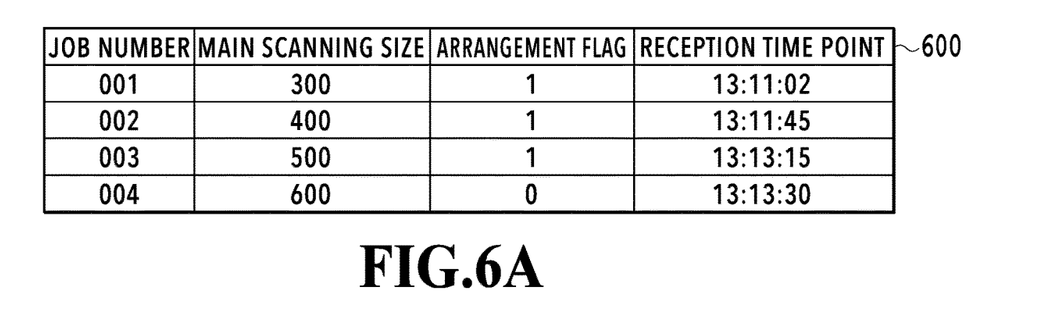
FIG. 6A is a diagram illustrating a specific example of a printing job list according to the embodiment of the present disclosure.

FIGS. 6A and 6B are diagrams illustrating a specific example of a printing job list 600 to which the setting information 502 is registered. As illustrated in FIG. 6A, in the present embodiment, the length of an image represented by image data in the main scanning direction, an arrangement flag, and a reception time point are registered to the printing job list 600 in association with one another for each printing job. The printing job list 600 is stored in the RAM 114 in the present embodiment but may be stored in a storage apparatus other than the RAM 114. At S302, when registering the length of the image of the setting information 502 in the main scanning direction to the printing job list 600, the printing job registration unit 202 allocates, to each printing job, a job number unique to the printing job and registers the reception time point of each received printing job.

The job number enables unique identification of a printing job to which registration information in the printing job list 600 corresponds. In the present embodiment, the job number of a printing job received first is "001" and then job numbers are allocated in ascending order as illustrated in FIG. 6A. The nesting control unit 205 can uniquely identify the order of reception of a printing job by the host IF 112 by referring to the job number.

Figure 6B:
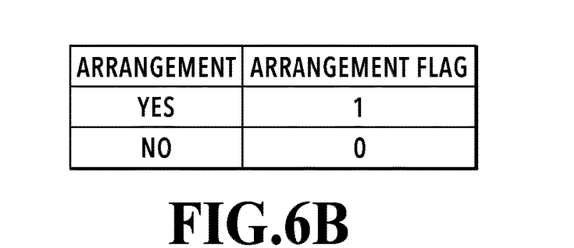
FIG. 6B is a diagram illustrating a specific example of attribute information according to the embodiment of the present disclosure.

The arrangement flag as an item provided in the printing job list 600 is an identifier indicating whether to arrange an image represented by image data corresponding to each printing job in the main scanning direction of the sheet 400. The arrangement flag is defined as a variable as illustrated in FIG. 6B, for example. The arrangement flag is set to "1" in a case where the image is to be arranged in the main scanning direction of the sheet 400, or is set to "0" in a case where the image is not to be arranged in the main scanning direction of the sheet 400. The arrangement flag is set at S304 and S307 to be described later. A table that defines the variable of the arrangement flag illustrated in FIG. 6B is stored in the RAM 114 in advance.

Figure 7A:
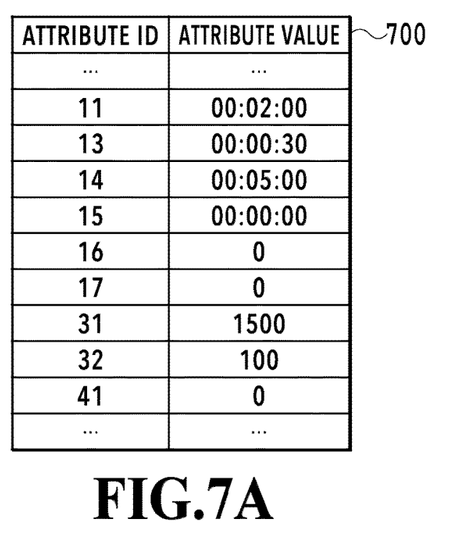
FIG. 7A is a diagram illustrating a specific example of printing attribute information according to the embodiment of the present disclosure.

At S303, the nesting control unit 205 refers to printing attribute information 700 illustrated in FIG. 7A and obtains the configurable width 404 that is the length of the sheet 400 in the main scanning direction. In addition, the nesting control unit 205 refers to the printing job list 600 and obtains the lengths of the image of the printing job received at the latest S301 and the image of each printing job having the arrangement flag set to "1" in the main scanning direction. The nesting control unit 205 calculates the sum width of the obtained configurable width 404, the length of the image of each printing job registered to the printing job list 600 in the main scanning direction, the length of the image of any other printing job having the arrangement flag set to "1" in the main scanning direction, and inter-image margins. If the calculated sum width is equal to or smaller than the configurable width 404, it is determined whether the image of the printing job received at S301 can be arranged on the sheet. If the image of the printing job received at the latest S301 can be arranged on the sheet 400 (YES at S303), the nesting control unit 205 proceeds to S304. If the image of the printing job received at the latest S301 cannot be arranged on the sheet 400 (NO at S303), the nesting control unit 205 proceeds to S307.

Figure 7B:
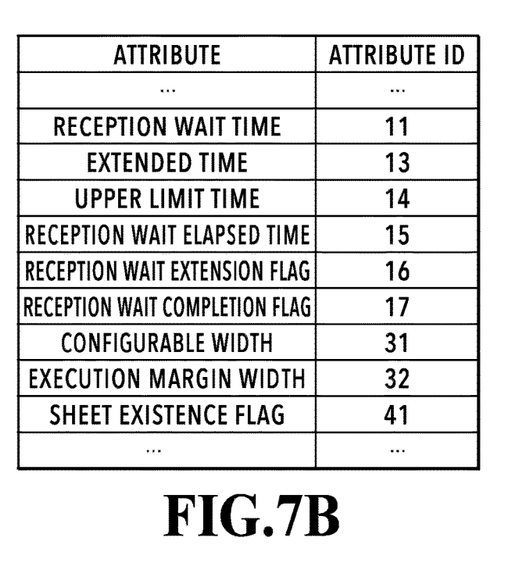
FIG. 7B is a diagram illustrating a specific example of attribute information according to the embodiment of the present disclosure.

FIGS. 7A to 7E are diagrams illustrating a specific example of the printing attribute information referred to by the nesting control unit 205. The printing attribute information 700 illustrated in FIG. 7A registers an attribute ID allocated to each attribute illustrated in FIG. 7B, and an attribute value corresponding to the attribute ID. Examples of such properties in the present embodiment include a reception wait time, an extended time, an upper limit time, a reception wait elapsed time, a reception wait extension flag, a reception wait completion flag, a configurable width, an execution margin width, and a sheet existence flag as illustrated in FIG. 7B.

Figure 7C:
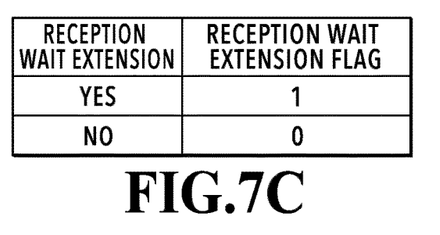
FIG. 7C is a diagram illustrating a specific example of attribute information according to the embodiment of the present disclosure.
Figure 7D:
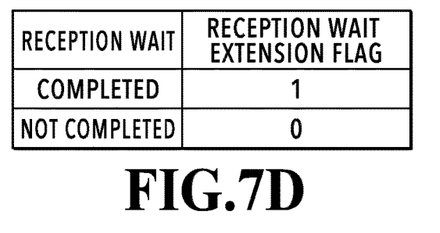
FIG. 7D is a diagram illustrating a specific example of attribute information according to the embodiment of the present disclosure.
Figure 7E:
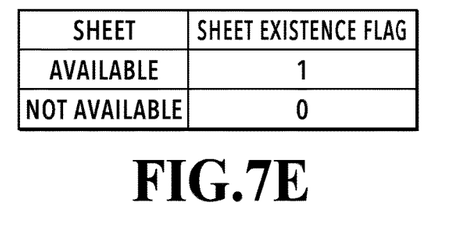
FIG. 7E is a diagram illustrating a specific example of attribute information according to the embodiment of the present disclosure.

The reception wait time (attribute ID: 11) is a time from start to completion of printing job reception wait. The extended time (attribute ID: 13) is a time by which printing job reception wait is extended. The upper limit time (attribute ID: 14) is the upper limit of the time from start to completion of printing job reception wait. The reception wait elapsed time (attribute ID: 15) is an elapsed time since start of printing job reception wait. The reception wait extension flag (attribute ID: 16) is an identifier allocated to "1" in a case where printing job reception wait is extended or "0" in a case where reception wait is not extended as illustrated in FIG. 7C. The reception wait completion flag (attribute ID: 17) is an identifier allocated to "1" in a case where printing job reception wait is completed or "0" in a case where reception wait is not completed as illustrated in FIG. 7D. The sheet existence flag (attribute ID: 41) is an identifier allocated to "1" in a case where a sheet is set to the image formation apparatus 100 or "0" in a case where no sheet is set as illustrated in FIG. 7E. Information related to properties, including the printing attribute information 700 illustrated in FIGS. 7A to 7E is stored in a storage apparatus such as the RAM 114. The above-described properties are examples and any other attribute may be included. For example, properties indicating sheet jam, the number of remaining sheets, the remaining amount of each color material, and whether a set sheet matches a designated sheet kind may be included as properties for determining whether printing processing is executable in addition to the sheet existence flag. The number of remaining sheets and the remaining amount of each color material are properties indicating whether the remaining amounts are enough for printing processing based on the printing image data to be appropriately completed. Each remaining amount may be a predetermined value or may be a value determined in accordance with the printing image data. The attribute values of these properties for determining whether printing processing is executable are set in accordance with a result of determination based on predetermined information obtained from the print engine unit 120 or the like by the operation status determination unit 204 and are updated by the operation status determination unit 204 as needed.

At S304, the nesting control unit 205 sets, to the printing job list 600, "1" as the arrangement flag corresponding to the printing job (job number: 001) received at the latest S301.

At S305, the nesting control unit 205 refers to the printing attribute information 700 illustrated in FIG. 7 and obtains the configurable width 404 and the execution margin width 405. Then, if a margin width after image arrangement, which is the difference between the configurable width 404 and the sum width calculated at S303 is larger than the execution margin width 405 (YES at S305), the nesting control unit 205 proceeds to S306. If the margin width after image arrangement is smaller than the execution margin width 405 (NO at S305), the nesting control unit 205 sets "1" as the reception wait completion flag to the printing attribute information 700 and proceeds to S308. The execution margin width 405 stored in the printing attribute information 700 is used in the present embodiment, but information of the execution margin width 405 may be included in the setting information 502 of the printing job.

At S306, the nesting control unit 205 refers to the printing attribute information 700 and obtains the reception wait extension flag and the reception wait time. In addition, the nesting control unit 205 refers to the printing job list 600 and obtains the reception time point corresponding to the printing job received at the latest S301. Then, the nesting control unit 205 calculates a reception wait completion time point at which printing job reception wait is to be completed based on the reception wait time and the reception time point thus obtained. If the obtained reception wait extension flag is "0", the nesting control unit 205 performs subsequent printing job reception wait until the reception wait completion time point is passed. If the obtained reception wait extension flag is "1", the nesting control unit 205 refers to the printing attribute information 700 and obtains the sheet existence flag. Then, the nesting control unit 205 performs subsequent printing job reception wait until it is detected that the reception wait completion time point is passed or the sheet existence flag is set to "1".

The nesting control unit 205 proceeds to S308 if no subsequent printing job is received while printing job reception wait is performed (NO at S306), or the process returns to S301 if a subsequent printing job is received (YES at S306).

The following describes a case where the image of the printing job received at the latest S301 cannot be arranged on the sheet 400 at S303 (NO at S303) and the nesting control unit 205 proceeds to S307.

At S307, the nesting control unit 205 refers to the printing job list 600 and sets "0" as the arrangement flag corresponding to a printing job (job number: 004). In addition, the nesting control unit 205 refers to the printing attribute information 700 and sets "1" as the reception wait completion flag. Then, the nesting control unit 205 proceeds to S308.

At S308, the nesting control unit 205 refers to the printing attribute information 700 and obtains the reception wait completion flag and the sheet existence flag. The sheet existence flag is set to an attribute value determined in accordance with a result of determination based on information obtained from the print engine unit 120 or the like at a predetermined timing by the operation status determination unit 204 and is updated by the operation status determination unit 204 as needed. Then, the nesting control unit 205 determines whether the image formation apparatus 100 can start printing processing based on the obtained sheet existence flag. If the obtained sheet existence flag is "1" (YES at S308), the nesting control unit 205 proceeds to S311. If the sheet existence flag is "0" but the reception wait completion flag is "1", the nesting control unit 205 stands by at S308 and continues to obtain the sheet existence flag, and then proceeds to S311 if the obtained sheet existence flag is "1" (YES at S308). If the obtained sheet existence flag is "0" (NO at S308), the nesting control unit 205 proceeds to S309.

At S309, the nesting control unit 205 refers to the printing attribute information 700 and obtains the reception wait elapsed time and the upper limit time. Then, the nesting control unit 205 determines whether to extend printing job reception wait based on the reception wait elapsed time and the upper limit time thus obtained. If the reception wait elapsed time has passed the upper limit time (NO at S309), the nesting control unit 205 sets "1" as the reception wait completion flag to the printing attribute information 700 and proceeds to S308. If the reception wait elapsed time has not passed the upper limit time (YES at S309), the nesting control unit 205 proceeds to S310.

At S310, the nesting control unit 205 refers to the printing attribute information 700 and obtains the reception wait time and the extended time. Then, the nesting control unit 205 sets the sum of the obtained reception wait time and the extended time as the reception wait time to the printing attribute information 700 and sets "1" as the reception wait extension flag, and then proceeds to S306.

The following describes a case where the obtained sheet existence flag is "1" at S308 (YES at S308) and the nesting control unit 205 proceeds to S311.

At S311, the nesting control unit 205 refers to the printing job list 600 and obtains image data corresponding to all printing jobs having the arrangement flag set to "1", and then starts printing processing. Upon an instruction from the nesting control unit 205, printing image data generated by providing the image data obtained by the image processing unit 116 with image processing for arrangement in the main scanning direction is stored in the RAM 114. The nesting control unit 205 requests printing of the printing image data, which is generated by providing the image processing, to the print controller 122 through the print engine IF 113 and the controller IF 121. The print controller 122 stores the received printing image data in the RAM 124. The print controller 122 controls the image processing controller 125 to convert the printing image data stored in the RAM 124 into printing data that can be used by the printing head 130 for printing operation. Once the printing data is generated, the print controller 122 causes the conveyance control unit 129 to execute sheet conveyance and causes the printing head 130 to execute printing operation based on the printing data in cooperation with the conveyance, thereby completing printing processing.

At S312, the nesting control unit 205 refers to the printing job list 600 and determines whether a printing job having the arrangement flag set to "0" exists. If a printing job having the arrangement flag set to "0" exists (YES at S312), the nesting control unit 205 proceeds to S303. If no printing job having the arrangement flag set to "0" exists (NO at S312), the nesting control unit 205 completes the processing.

The following describes specific processing in a case where four printing jobs are received.

<Processing Performed in the First Loop>

At S301, the printing job reception unit 201 receives the first printing job from the host apparatus 190 by using the host IF 112.

At S302, the printing job registration unit 202 extracts the image data 501 and the setting information 502 from the first printing job received at the latest S301, stores the image data 501 in the RAM 114, and registers the setting information 502 to the printing job list 600. As illustrated in FIG. 6A, "001" is allocated as the job number of the first printing job received in the first loop.

At S303, the nesting control unit 205 refers to the printing attribute information 700 illustrated in FIG. 7A and obtains "1500" as the configurable width 404 (attribute ID: 31) that is the length of the sheet 400 in the main scanning direction. In addition, the nesting control unit 205 obtains, from the printing job list 600 illustrated in FIG. 6A, the lengths of the image of the first printing job (job number: 001) and the image of each printing job that is received before reception of the first printing job and has the arrangement flag set to "1" in the main scanning direction, and calculates the sum width thereof. However, since the current loop is the first loop, no printing job is received before reception of the first printing job (job number: 001). Thus, the sum width is the length "300" of the image 401 of the first printing job (job number: 001) in the main scanning direction and is smaller than "1500" as the configurable width 404. Accordingly, the image 401 can be arranged in the main scanning direction of the sheet 400 (YES at S303), and thus the nesting control unit 205 proceeds to S304.

At S304, the nesting control unit 205 sets "1" as the arrangement flag corresponding to the printing job (job number: 001) received at the latest S301 to the printing job list 600.

At S305, the nesting control unit 205 refers to the printing attribute information 700 illustrated in FIG. 7A and obtains "1500" as the configurable width 404 and "100" as the execution margin width 405. Since no printing job that is received before reception of the first printing job (job number: 001) and has the arrangement flag set to "1" exists, the first printing job is the only printing job having the arrangement flag of "1" in the printing job list 600. The length of the image 401 of the first printing job in the main scanning direction is "300". Thus, "1200" calculated by subtracting "300" as the length of the image 401 of the first printing job in the main scanning direction from "1500" as the configurable width 404 is the margin width after image arrangement. Since "1200" as the margin width after image arrangement is larger than "100" as the execution margin width 405 (YES at S305), the nesting control unit 205 proceeds to S306.

At S306, the nesting control unit 205 refers to the printing attribute information 700 illustrated in FIG. 7A and obtains "0" as the reception wait extension flag and "00:02:00" as the reception wait time. In addition, the nesting control unit 205 obtains "13:11:02" as the reception time point corresponding to the first printing job received at the latest S301 (job number: 001) as illustrated in FIG. 6A. Accordingly, "13:13:02" calculated by adding "00:02:00" as the reception wait time to "13:11:02" as the reception time point of the first printing job is the reception wait completion time point. Thus, the nesting control unit 205 performs subsequent printing job reception wait until "13:13:02" as the reception wait completion time point is passed. In the present embodiment, since a subsequent printing job is received at "13:11:45" (YES at S306), the nesting control unit 205 returns to S301. The reception wait elapsed time in the printing attribute information 700 at a time point at which the subsequent printing job is received is "00:00:43" calculated by subtracting the reception time point "13:11:02" of the printing job (job number: 001) from the reception time point "13:11:45" of the subsequent printing job.

<Processing Performed in the Second Loop>

At S301, the printing job reception unit 201 receives the second printing job from the host apparatus 190 by using the host IF 112.

At S302, the printing job registration unit 202 extracts the image data 501 and the setting information 502 from the second printing job received in the current loop, stores the image data 501 in the RAM 114, and registers the setting information 502 to the printing job list 600. As illustrated in FIG. 6A, "002" is allocated as the job number of the second printing job received in the second loop.

At S303, the nesting control unit 205 refers to the printing attribute information 700 illustrated in FIG. 7A and obtains "1500" as the configurable width 404 that is the length of the sheet 400 in the main scanning direction. The nesting control unit 205 also obtains "300" as the length of the image 401 of the printing job (job number: 001), which has the arrangement flag set to "1" among printing jobs received before reception of the second printing job (job number: 002) as illustrated in FIG. 6A, in the main scanning direction. Then, the nesting control unit 205 obtains "400" as the length of the image 402 represented by image data corresponding to the second printing job (job number: 002) currently received in the main scanning direction as illustrated in FIG. 6A. In the present embodiment, "10" is obtained as the default value of an inter-image margin width. The inter-image margin width may be included in the printing attribute information 700 or the setting information 502 of the printing job. Accordingly, the sum width of the images 401 and 402 in the main scanning direction is "710" and smaller than "1500" as the configurable width 404. Thus, the image 402 can be arranged in the main scanning direction of the sheet (YES at S303), and the nesting control unit 205 proceeds to S304.

At S304, the nesting control unit 205 sets "1" as the arrangement flag corresponding to the second printing job (job number: 002) to the printing job list 600.

At S305, the nesting control unit 205 refers to the printing attribute information 700 illustrated in FIG. 7A and obtains "1500" as the configurable width 404 and "100" as the execution margin width 405. The nesting control unit 205 also refers to the printing job list 600 and obtains the length "300" of the image of the printing job (job number: 001), which has the arrangement flag set to "1" among printing jobs received before reception of the second printing job (job number: 002), in the main scanning direction. In addition, since the arrangement flag of the second printing job (job number: 002) received in the current loop is "1", the nesting control unit 205 obtains, from the printing job list 600, the length "400" of the image 402 of the second printing job in the main scanning direction. Accordingly, "790" calculated by subtracting "300" and "400" as the lengths of the images 401 and 402 in the main scanning direction and the inter-image margin width "10" from "1500" as the configurable width 404 is the margin width after image arrangement. Since "790" as the margin width after image arrangement is larger than "100" as the execution margin width 405 (YES at S305), the nesting control unit 205 proceeds to S306.

At S306, the nesting control unit 205 refers to the printing attribute information 700 illustrated in FIG. 7A and obtains "0" as the reception wait extension flag and "00:02:00" as the reception wait time. The nesting control unit 205 also obtains "13:11:02" as the reception time point corresponding to the first the printing job (job number: 001) received in the first loop as illustrated in FIG. 6A. Accordingly, "13:13:02" calculated by adding "00:02:00" as the reception wait time to "13:11:02" as the reception time point of the first printing job is the reception wait completion time point. Thus, the nesting control unit 205 performs subsequent printing job reception wait until "13:13:02" as the reception wait completion time point is passed. In the present embodiment, the reception time point of the third printing job (job number: 003) subsequently received is "13:13:15" as illustrated in the printing job list 600. Accordingly, no subsequent printing job is received until "13:13:02" as the reception wait completion time point (NO at S306), and thus the nesting control unit 205 proceeds to S308. The reception wait elapsed time in the printing attribute information 700 at a time point at which reception wait is performed until the reception wait completion time point is "00:02:00", which is the reception wait time.

At S308, the nesting control unit 205 refers to the printing attribute information 700 and obtains the reception wait completion flag and the sheet existence flag. Then, the nesting control unit 205 determines whether printing processing can be started based on the obtained sheet existence flag. At the timing of S308 in the second loop in the present embodiment, the reception wait completion flag and the sheet existence flag are both "0" as illustrated in FIG. 7A (NO at S308), and thus the nesting control unit 205 proceeds to S309.

At S309, the nesting control unit 205 refers to the printing attribute information 700 and obtains the reception wait elapsed time and the upper limit time. Then, the nesting control unit 205 determines whether to extend printing job reception wait based on the reception wait elapsed time and the upper limit time thus obtained. In the present embodiment, the reception wait elapsed time and the upper limit time in the printing attribute information 700 are "00:02:00" and "00:05:00", respectively. At the timing of S309 in the second loop in the present embodiment, "00:02:00" as the reception wait elapsed time has not passed "00:05:00" as the upper limit time (YES at S309), and thus the nesting control unit 205 proceeds to S310.

At S310, the nesting control unit 205 refers to the printing attribute information 700 and obtains the reception wait time and the extended time. Then, the nesting control unit 205 sets, as the reception wait time to the printing attribute information 700, a value calculated by adding the extended time to the reception wait time thus obtained and sets "1" as the reception wait extension flag, and then the nesting control unit 205 proceeds to S306.

In the present embodiment, the reception wait time and the extended time are "00:02:00" and "00:00:30", respectively, as illustrated in FIG. 7A. Thus, in the present embodiment, "00:02:30" calculated by adding "00:00:30" the extended time to "00:02:00" as the reception wait time is set as the reception wait time.

At S306 after S310, the nesting control unit 205 refers to the printing attribute information 700 and obtains "1" as the reception wait extension flag and "00:02:30" as the reception wait time. The nesting control unit 205 also obtains "13:11:02" as the reception time point corresponding to the first the printing job (job number: 001) received in the first loop as illustrated in FIG. 6A. Accordingly, "13:13:32" calculated by adding "00:02:30" as the reception wait time to "13:11:02" as the reception time point of the first printing job is the reception wait completion time point. The sheet existence flag is "0" as illustrated in FIG. 7A. Thus, the nesting control unit 205 performs subsequent printing job reception wait until "13:13:32" as the reception wait completion time point is passed. In the present embodiment, since a subsequent printing job is received at "13:13:15" (YES at S306), the nesting control unit 205 returns to S301. The reception wait elapsed time in the printing attribute information 700 at a time point at which the subsequent printing job is received is "00:02:13" calculated by subtracting the reception time point "13:11:02" of the first printing job from the reception time point "13:13:15" of the subsequent printing job.

<Processing Performed in the Third Loop>

At S301, the printing job reception unit 201 receives the third printing job from the host apparatus 190 by using the host IF 112.

At S302, the printing job registration unit 202 extracts the image data 501 from the third printing job received in the current loop and stores the image data 501 in the RAM 114, and also extracts the setting information 502 and registers the setting information 502 to the printing job list 600. As illustrated in FIG. 6A, "003" is allocated as the job number of the third printing job received in the third loop in the present embodiment.

At S303, the nesting control unit 205 obtains "1500" as the configurable width 404 as illustrated in FIG. 7A. In addition, the nesting control unit 205 refers to the printing job list 600 illustrated in FIG. 6A and obtains "300" and "400" as the lengths of the images 401 and 402 of printing jobs having the arrangement flag set to "1" and received before reception of the third printing job (job number: 003) in the main scanning direction. Then, the nesting control unit 205 obtains "500" as the length of the image 403 corresponding to the third printing job (job number: 003) currently received in the main scanning direction as illustrated in FIG. 6A. Thus, the length of the images 401, 402, and 403 in the main scanning direction when arranged is the sum "1220" of "300", "400", "500", and the inter-image margin width "20" and is smaller than "1500" as the configurable width 404. Accordingly, the image 403 can be arranged in the main scanning direction of the sheet (YES at S303), and thus the nesting control unit 205 proceeds to S304.

At S304, the nesting control unit 205 refers to the printing job list 600 and sets "1" as the arrangement flag corresponding to the printing job (job number: 003).

At S305, the nesting control unit 205 refers to the printing attribute information 700 illustrated in FIG. 7A and obtains "1500" as the configurable width 404 and "100" as the execution margin width 405. The nesting control unit 205 also refers to the printing job list 600 illustrated in FIG. 6A and obtains the lengths "300" and "400" of the images 401 and 402 of printing jobs having the arrangement flag of "1" among printing jobs received before reception of the third the printing job (job number: 003) in the main scanning direction. In addition, since the arrangement flag of the third printing job received in the current loop is "1", the nesting control unit 205 obtains the length "500" of the image 403 of the third printing job in the main scanning direction from the printing job list 600. Thus, "280" calculated by subtracting "300", "400", and "500" as the lengths of the images 401 to 403 in the main scanning direction and the inter-image margin width "20" from "1500" as the configurable width 404 is the sheet margin width. Accordingly, "280" as the sheet margin width is larger than "100" as the execution margin width 405 (YES at S305), and thus the nesting control unit 205 proceeds to S306.

At S306, the nesting control unit 205 refers to the printing attribute information 700 and obtains "1" as the reception wait extension flag. Then, the nesting control unit 205 obtains "00:02:30" as the reception wait time in the printing attribute information 700. In addition, the nesting control unit 205 refers to the printing job list 600 illustrated in FIG. 6A and obtains the reception time point "13:11:02" corresponding to the first received printing job (job number: 001). Accordingly, "13:13:32" calculated by adding "00:02:30" as the reception wait time to "13:11:02" as the reception time point of the first printing job is the reception wait completion time point. The sheet existence flag is "0" as illustrated in FIG. 7A. Thus, the nesting control unit 205 performs subsequent printing job reception wait until "13:13:32" as the reception wait completion time point is passed. In the present embodiment, since a subsequent printing job is received at "13:13:30" (YES at S306), the nesting control unit 205 returns to S301. The reception wait elapsed time in the printing attribute information 700 at a time point at which the subsequent printing job is received is "00:02:28" calculated by subtracting the reception time point "13:11:02" of the printing job from the reception time point "13:13:30" of the subsequent printing job.

<Processing Performed in the Fourth Loop>

At S301, the printing job reception unit 201 receives the fourth printing job from the host apparatus 190 by using the host IF 112.

At S302, the printing job registration unit 202 extracts the image data 501 from the fourth printing job received in the current loop and stores the image data 501 in the RAM 114, and also extracts the setting information 502 and registers the setting information 502 to the printing job list 600. As illustrated in FIG. 6A, "004" is allocated as the job number of the fourth printing job received in the fourth loop in the present embodiment.

At S303, the nesting control unit 205 refers to the printing attribute information 700 illustrated in FIG. 7A and obtains "1500" as the configurable width 404. The nesting control unit 205 also refers to the printing job list 600 illustrated in FIG. 6A and obtains the lengths of the images of the printing jobs (job numbers: 001, 002, and 003) having the arrangement flag set to "1" and received before reception of the fourth the printing job (job number: 004) in the main scanning direction. The lengths of the images 401 to 403 of the printing jobs (job numbers: 001, 002, and 003) in the main scanning direction are "300", "400", and "500" as illustrated in FIG. 6A. The length of the image of the fourth the printing job (job number: 004) currently received in the main scanning direction is "600" as illustrated in FIG. 6A. Thus, "1800" calculated by adding the length of the image of the fourth printing job in the main scanning direction to the sum width "1200" of the images 401 to 403 when arranged in the main scanning direction is larger than "1500" as the configurable width 404. Accordingly, the image of the fourth printing job cannot be arranged with the images 401 to 403 on the sheet 400 in the main scanning direction (NO at S303), and thus the nesting control unit 205 proceeds to S307.

At S307, the nesting control unit 205 sets, to the printing job list 600, "0" as the arrangement flag corresponding to the fourth the printing job (job number: 004). In addition, the nesting control unit 205 sets "1" as the reception wait completion flag to the printing attribute information 700.

At S308, the nesting control unit 205 refers to the printing attribute information 700 and obtains "1" as the reception wait completion flag and "0" as the sheet existence flag, and then stands by while updating the sheet existence flag. Thereafter, when having obtained "1" as the sheet existence flag, the nesting control unit 205 proceeds to S311. In the present embodiment, the sheet is set to the image formation apparatus 100 after the reception time point "13:13:30" of the fourth the printing job (job number: 004). Once the sheet is set, the operation status determination unit 204 sets "1" as the sheet existence flag to the printing attribute information 700. In the present embodiment, in a case where the obtained sheet existence flag is "0", the nesting control unit 205 stands by and suspends processing until it is detected that the sheet existence flag is set to "1", but the nesting control unit 205 may stop printing processing instead of suspending.

At S311, the nesting control unit 205 refers to the printing job list 600 and obtains image data corresponding to all printing jobs (job numbers: 001, 002, and 003) having the arrangement flag set to "1", and then starts printing processing. The nesting control unit 205 requests the print controller 122 to print printing image data generated by arranging the images 401 to 403 in the main scanning direction through the image processing unit 116. The print controller 122 controls the image processing controller 125 to convert the printing image data into printing data, the conveyance control unit 129 to execute conveyance of the sheet, and the printing head 130 to execute printing operation based on the printing data in cooperation with the conveyance.

At S312, the nesting control unit 205 refers to the printing job list 600 illustrated in FIG. 6A and determines that the fourth the printing job (job number: 004) having the arrangement flag set to "0" exists (YES at S312). Thus, the nesting control unit 205 sets, to the printing job list 600, "1" as the arrangement flag corresponding to the fourth printing job and then proceeds to S306.

As described above, since a printing job reception wait time is determined based on whether the image formation apparatus 100 can execute printing processing, the image 403 of the third printing job received after the initial reception wait completion time point can be printed alongside the images 401 and 402. In this manner, according to the present embodiment, it is possible to reduce margins generated in the main scanning direction of the sheet at printing execution.

In the present embodiment, whether printing processing is executable is determined based on whether a sheet is set to the image formation apparatus 100, but sheet remaining amount information such as the remaining length of a sheet may be included in the printing attribute information 700. Whether printing processing is executable may be determined based on the sheet remaining amount information, and accordingly, the printing job reception wait time may be determined.

Moreover, ink remaining amount information such as the remaining amount of ink may be included in the printing attribute information 700. Whether printing processing is executable may be determined based on the ink remaining amount information, and accordingly, printing job reception wait may be extended.

Furthermore, sheet type information such as the size or kind of a sheet may be included in the printing attribute information 700. In addition, designated sheet type information such as the size or kind of a sheet to be printed may be included in the setting information 502. Whether printing processing is executable may be determined based on whether the sheet type information matches the designated sheet type information, and accordingly, the printing job reception wait time may be determined.

(Other Embodiments)

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

According to the present disclosure, it is possible to reduce any unnecessary margin on a sheet in a case where a plurality of images are arranged and printed on the sheet.

This application claims the benefit of priority from Japanese Patent Application No. 2023-006376, filed Jan. 19, 2023, which is hereby incorporated by reference wherein in its entirety.

What is claimed is:

1. An image processing apparatus comprising:
at least one memory storing instructions; and
at least one processor that executes the stored instructions, which cause the at least one processor to:
receive a printing job;
generate printing image data that at least a part of a plurality of pieces of image data corresponding to a plurality of printing jobs received in a predetermined wait time are allocated in a direction orthogonal to a sheet conveyance direction; and
control a printing apparatus to execute printing processing based on the printing image data,
wherein the at least one processor extends the predetermined wait time in a case where the printing apparatus that performs printing based on the generated printing image data is in a predetermined state in which the printing apparatus cannot perform printing, the predetermined wait time being a period for receiving the plurality of printing jobs corresponding to the plurality of pieces of image data to be allocated in the printing image data.

2. The image processing apparatus according to claim 1, wherein the at least one processor further detects the predetermined state, and
generates the printing image data in a case where the predetermined state is not detected while the predetermined wait time is extended.

3. The image processing apparatus according to claim 2, wherein the at least one processor controls the printing apparatus to stop the printing processing in a case where the extended predetermined wait time elapses while the predetermined state is detected.

4. The image processing apparatus according to claim 2, wherein the at least one processor controls the printing apparatus to suspend the printing processing in a case where the extended predetermined wait time elapses while the predetermined state is detected.

5. The image processing apparatus according to claim 4, wherein the at least one processor controls the printing apparatus to execute the printing processing in a case where the predetermined state is not detected after the extended predetermined wait time elapses.

6. The image processing apparatus according to claim 1, wherein the predetermined state in which the printing apparatus cannot start printing includes at least one of sheet jam, whether a number of remaining sheets is enough for completion of printing based on the printing image data, whether a remaining amount of any color material is enough for completion of printing based on the printing image data, and whether a set sheet matches a designated sheet kind.

7. The image processing apparatus according to claim 1, wherein the at least one processor can extend the predetermined wait time to a predetermined upper limit time.

8. An image formation apparatus comprising:
an image processing apparatus including at least one memory storing instructions; and
at least one processor that executes the stored instructions, which cause the at least one processor to:
receive a printing job,
generate printing image data that at least a part of a plurality of pieces of image data corresponding to a plurality of printing jobs received in a predetermined wait time are allocated in a direction orthogonal to a sheet conveyance direction, and
control a printing apparatus to execute printing processing based on the printing image data,
wherein the printing apparatus executes printing based on the printing image data, and
wherein the least one processor extends the predetermined wait time in a case where the printing apparatus is in a predetermined state in which the printing apparatus cannot perform printing, the predetermined wait time being a period for receiving the plurality of printing jobs corresponding to the plurality of pieces of image data to be allocated in the printing image data.

9. An image processing method comprising:
receiving a printing job;
generating printing image data that at least a part of a plurality of pieces of image data corresponding to a plurality of printing jobs received in a predetermined wait time by the receiving are allocated in a direction orthogonal to a sheet conveyance direction; and
controlling a printing apparatus to execute printing processing based on the printing image data,
wherein the controlling extends the predetermined wait time in a case where the printing apparatus that performs printing based on the printing image data generated by the generating is in a predetermined state in which the printing apparatus cannot perform printing, the predetermined wait time being a period for receiving the plurality of printing jobs corresponding to the plurality of pieces of image data to be allocated in the printing image data.

10. A non-transitory computer readable storage medium storing a program that causes a computer to execute an image processing method comprising:
receiving a printing job;
generating printing image data that at least a part of a plurality of pieces of image data corresponding to a plurality of printing jobs received in a predetermined wait time by the receiving are allocated in a direction orthogonal to a sheet conveyance direction; and
controlling a printing apparatus to execute printing processing based on the printing image data,
the controlling to extend the predetermined wait time in a case where the printing apparatus that performs printing based on the printing image data generated by the generating is in a predetermined state in which the printing apparatus cannot perform printing, the predetermined wait time being a period for receiving the plurality of printing jobs corresponding to the plurality of pieces of image data to be allocated in the printing image data.

11. The image processing apparatus according to claim 1, wherein the plurality of print jobs are determined as nesting printing targets.

* * * * *